(12) United States Patent
Gao et al.

(10) Patent No.: US 11,896,960 B1
(45) Date of Patent: Feb. 13, 2024

(54) HIGH-EFFICIENCY VISIBLE-LIGHT CATALYTIC MATERIAL AND PREPARATION METHOD AND APPLICATION THEREOF

(71) Applicants: Jiangsu Vocational College of Agriculture and Forestry, Jurong (CN); Huayu Automotive Electric Drive System Co., Ltd., Shanghai (CN)

(72) Inventors: Daxiang Gao, Jurong (CN); Zhong Gao, Shanghai (CN); Lin Wang, Jurong (CN); Hetong Yang, Jurong (CN); Jun Shi, Jurong (CN); Gangjun Xi, Jurong (CN)

(73) Assignees: Jiangsu Vocational College of Agriculture and Forestry, Jurong (CN); Huayu Automotive Electric Drive System Co., Ltd., Shanghai (CN)

( * ) Notice: Subject to any disclaimer, the term of this patent is extended or adjusted under 35 U.S.C. 154(b) by 0 days.

(21) Appl. No.: 18/353,385

(22) Filed: Jul. 17, 2023

(30) Foreign Application Priority Data

Jul. 20, 2022 (CN) .......................... 202210850837.X

(51) Int. Cl.
| | |
|---|---|
| *B01J 27/10* | (2006.01) |
| *B01J 31/06* | (2006.01) |
| *B01J 31/26* | (2006.01) |
| *B01J 37/04* | (2006.01) |
| *B01J 37/03* | (2006.01) |
| *B01J 37/00* | (2006.01) |

(Continued)

(52) U.S. Cl.
CPC ............... *B01J 27/10* (2013.01); *B01J 23/50* (2013.01); *B01J 31/061* (2013.01); *B01J 31/26* (2013.01);

(Continued)

(58) Field of Classification Search
CPC .......... A61L 27/20; A61L 27/12; A61L 27/52; A61L 27/58; B01J 35/00; B01J 31/06;

(Continued)

(56) References Cited

FOREIGN PATENT DOCUMENTS

| CN | 102302924 A | | 1/2012 |
|---|---|---|---|
| CN | 102600870 A | * | 7/2012 |

(Continued)

OTHER PUBLICATIONS

Load Silver Phosphate/silver Polyphosphate/silver Chloride Composite Water Processed Photocatalyst And Preparation Method Thereof; Nventor Zhao, Jin-xing; Date Filed Mar. 13, 2012 (Year: 2012).*

(Continued)

*Primary Examiner* — Walter D. Griffin
*Assistant Examiner* — Cameron J Allen
(74) *Attorney, Agent, or Firm* — Rachel Pilloff; Sean Passino; Martin Cosenza

(57) ABSTRACT

A high-efficiency visible-light catalytic material, a preparation method and an application thereof are provided by the present application, relating to the technical field of photocatalytic materials. The present application prepares photocatalytic material Ag@AgCl/CA by compounding Ag@AgCl and calcium alginate gel, and the prepared photocatalytic material is shaped as small particles. The photocatalytic material Ag@AgCl/CA is used to degrade tetracycline antibiotics.

4 Claims, 16 Drawing Sheets

(51) Int. Cl.
| | |
|---|---|
| *B01J 37/34* | (2006.01) |
| *B01J 37/06* | (2006.01) |
| *B01J 37/02* | (2006.01) |
| *B01J 35/00* | (2006.01) |
| *C02F 1/30* | (2023.01) |
| *C02F 1/72* | (2023.01) |
| *B01J 23/50* | (2006.01) |
| *C02F 101/38* | (2006.01) |
| *C02F 101/34* | (2006.01) |

(52) U.S. Cl.
CPC .......... *B01J 35/004* (2013.01); *B01J 37/009* (2013.01); *B01J 37/0236* (2013.01); *B01J 37/031* (2013.01); *B01J 37/04* (2013.01); *B01J 37/06* (2013.01); *B01J 37/345* (2013.01); *C02F 1/30* (2013.01); *C02F 1/725* (2013.01); *C02F 2101/34* (2013.01); *C02F 2101/38* (2013.01); *C02F 2305/10* (2013.01)

(58) Field of Classification Search
CPC ... B01J 23/50; B01J 31/26; B01J 37/06; B01J 37/02; B01J 27/10; C02F 1/30; C02F 1/72; C02F 1/28; B01D 21/00; B01D 21/28
See application file for complete search history.

(56) References Cited

FOREIGN PATENT DOCUMENTS

| | | | |
|---|---|---|---|
| CN | 103058261 A | | 4/2013 |
| CN | 103752292 A | | 4/2014 |
| CN | 103769033 A | | 5/2014 |
| CN | 104018020 A | * | 9/2014 |
| CN | 105833853 A | | 8/2016 |
| CN | 107185414 A | | 9/2017 |
| CN | 107497492 A | | 12/2017 |
| CN | 107511149 A | | 12/2017 |
| CN | 107585831 A | | 1/2018 |
| CN | 108816291 A | | 11/2018 |
| CN | 110394160 A | | 11/2019 |
| CN | 110960992 A | | 4/2020 |
| CN | 112281257 A | | 1/2021 |
| CN | 112808289 A | | 5/2021 |
| CN | 113083174 A | | 7/2021 |
| DE | 102020120702 A1 | | 2/2022 |
| EP | 0380228 A2 | | 8/1990 |
| JP | 2017042689 A | | 3/2017 |

OTHER PUBLICATIONS

CN 104018020—Translation (Year: 2014).*
First Office Action for China Application No. 202210850837.X, dated Mar. 29, 2023.
Notice of Registration for China Application No. 202210850837.X, dated Apr. 19, 2023.
Huiqin Wang et al., "High photocatalytic degradation of tetracycline under visible light with Ag/AgCl/activated carbon composite plasmonic photocatalyst," Journal of Industrial and Engineering Chemistry, Dec. 2015, pp. 83-92, vol. 35.
Wang Huan, "Effects of Surfactants On the Adsorption Properties of Graphene Oxide Alginate Beads," Specialty Petrochemicals, Jan. 2020, vol. 37, No. 1.

* cited by examiner

HIGH-EFFICIENCY VISIBLE-LIGHT CATALYTIC MATERIAL AND PREPARATION METHOD AND APPLICATION THEREOF

CROSS-REFERENCE TO RELATED APPLICATIONS

This application claims priority to Chinese Patent Application No. 202210850837.X, filed on Jul. 20, 2022, the contents of which are hereby incorporated by reference.

TECHNICAL FIELD

The present application relates to the technical field of photocatalytic materials, and in particular to a high-efficiency visible-light catalytic material, a preparation method and an application thereof.

BACKGROUND

In recent decades, antibiotics have been widely applied in medication and animal husbandry, and the potential hazards arising from this have attracted growing attention. Tetracyclines (TCs) are the most commonly used antibiotics and are widely used as antimicrobial agents and growth factors in medication and animal husbandry. As a result, a large amount of tetracycline antibiotic wastewater is discharged into water bodies every year, causing drug residues in the environment. Oxytetracycline (OTC), also known as oxytetracycline, is a tetracycline antibiotic which, due to its stable nature, is difficult to degrade, resulting in environmental pollution. Conventional physical adsorption, chemical precipitation and biodegradation are not ideal for treating antibiotic wastewater.

As an emerging technology, photocatalytic oxidation technology demonstrates a strong degradation effect on tetracycline antibiotic wastewater. Currently, $TiO_2$ and its composite photocatalytic materials are usually used as photocatalysts for degrading OTC in studies of OTC photocatalytic water degradation. However, the nature of $TiO_2$, which responds only to ultraviolet (UV) light, limits the efficiency of its utilization of solar energy and its large-scale industrial application as a photocatalyst. Accordingly, developing new efficient visible-light catalytic materials to improve the photo-energy conversion efficiency and broaden the photo-response range of catalysts becomes the current hot spot in the research on catalytic materials.

In recent years, Ag @AgCl has attracted considerable attention as a new visible-light catalytic material. Ag @AgCl has a significant adsorption of visible-light owing to the surface plasmon resonance (SPR) effect of Ag. However, the powder material of Ag@AgCl has the disadvantages of easy agglomeration, small specific surface area, and poor adsorption properties that limit the application of the material, and composite photocatalytic materials of Ag @ AgCl with g-$C_3N_4$, $V_2O_5$, $MoO_3$, etc. are generally formed to improve their photochemical stability as well as photocatalytic activity. However, the composite photocatalytic materials formed with Ag@AgCl and calcium alginate (CA) gels for degrading antibiotics, especially for OTC, have not been reported.

SUMMARY

It is an objective of the present application to provide a high-efficiency visible-light catalytic material and a preparation method and an application thereof, so as to solve the above-mentioned problems of the prior art, to achieve efficient catalytic degradation of oxytetracycline (OTC) in a responsive range of visible-light, and to enable a manufactured catalytic material with advantages of easy recovery and recycling.

To achieve the above objectives, the present application provides following technical schemes:

the present application provides a preparation method of a high-efficiency visible-light catalytic material, including compounding Ag@AgCl and calcium alginate (CA) gel to prepare Ag@AgCl/CA as the high-efficiency visible-light catalytic material.

Optionally, the preparation method includes following steps: cross-linking sodium alginate (SA) with $Ca^{2+}$ to develop CA gel, then depositing AgCl in situ through chemical precipitation reaction, and preparing Ag@AgCl/CA through photoreduction as the high-efficiency visible-light catalytic material.

Optionally, the preparation method includes following steps:
(1) mixing cationic emulsifier and sodium alginate in a solution, followed by ultrasonically dispersing;
(2) adding $AgNO_3$, $Ca(NO_3)_2$ and NaCl into a mixed solution prepared in the step (1) in sequence, followed by stirring, standing, filtering and collecting precipitate; and
(3) adding the precipitate obtained in the step (2) into water, then irradiating with an ultraviolet lamp, filtering, washing and freeze-drying to obtain Ag@AgCl/CA as the high-efficiency visible-light catalytic material.

Optionally, the cationic emulsifier is cetyltrimethyl ammonium bromide.

Optionally, a duration for the standing in the step (2) is 4-8 hours (h).

Optionally, a mass ratio of the sodium alginate to the $AgNO_3$, the $Ca(NO_3)_2$ and the NaCl is 1:(2-3.5):4:(0.5-2), and a preferred mass ratio is 1:3:4:1.

Optionally, a power for the irradiating with the ultraviolet lamp is 10 Watts (W) and a duration is 30 minutes (min).

Another technical scheme of the present application provides a high-efficiency visible-light catalytic material prepared by the preparation method.

Another technical scheme of the present application provides an application of the high-efficiency visible-light catalytic material in degrading tetracycline antibiotics.

Optionally, the tetracycline antibiotics include OTC.

Aiming at the problems of poor stability, easy agglomeration, insufficient adsorption capacity and difficult recovery and recycling of AgCl, the present application forms a stable gel CA as a template by cross-linking sodium alginate (SA) with divalent cations (such as $Ca^{2+}$) under the dispersion of cationic emulsifier cetyltrimethylammonium bromide (CTAB), and then deposits AgCl in situ by chemical precipitation reaction and prepares the photocatalytic material of Ag@AgCl/CA insoluble particles by photoreduction.

The present application discloses the following technical effects:

by introducing anionic natural polymer polysaccharide solution to form a stable gel with divalent cations, the present application uses chemical coupling and in-situ deposition to load AgCl, and then prepares Ag@AgCl/CA photocatalytic material by photoreduction; the photocatalytic material is in the form of small particles with strong adsorption capacity, short photocatalytic degradation period, high catalytic efficiency, wide responsive range of visible-light and easy recovery and recycling, etc., and can be practically applied to degrade OTC wastewater; and the composite photocatalytic material Ag@AgCl/CA prepared by the present application has good visible-light absorption performance and shows high efficiency in degrading OTC wastewater under visible-light conditions (λ≥420 nanometers), suggesting great potential for application in practical photocatalyst production.

BRIEF DESCRIPTION OF THE DRAWINGS

To illustrate more clearly the technical schemes in the embodiments of the present application or in the prior art, a brief description of the accompanying drawings to be used in the embodiments is given below. It is obvious that the accompanying drawings in the following description are only some embodiments of the present application and that other accompanying drawings are available to those of ordinary skill in the art without any creative effort.

DETAILED DESCRIPTION OF THE EMBODIMENTS

Various exemplary embodiments of the present application are now described in detail, and this detailed description should not be considered a limitation of the present application, but should be understood as a more detailed description of certain aspects, features and embodiments of the present application.

It is to be understood that the terms described in the present application are intended to describe particular embodiments only and are not intended to limit the present application. Further, with respect to the range of values in the present application, it is to be understood that each intermediate value between the upper and lower limits of the range is also specifically disclosed. Each smaller range between any stated value or intermediate value within a stated range and any other stated value or intermediate value within a stated range is also included in the present application. The upper and lower limits of these smaller ranges may be independently included or excluded from the scope.

Unless otherwise specified, all technical and scientific terms used herein have the same meaning as commonly understood by one of ordinary skill in the art to which this present application relates. Although the present application only describes the preferred methods and materials, any methods and materials similar or equivalent to those described herein can also be used in the practice or testing of the present application. All documents mentioned in this specification are incorporated by reference to disclose and describe methods and/or materials related to the documents. In case of conflict with any incorporated document, the contents of this specification shall prevail.

Without departing from the scope or spirit of the present application, a variety of improvements and variations to specific embodiments of the specification of the present application are possible, as will be apparent to those skilled in the art. Other embodiments obtained from the specification of the present application are obvious to the skilled person. The specification and embodiments of the present application are only exemplary.

The terms "comprising", "including", "having" and "containing" used in this specification are all open terms, which means including but not limited to.

Embodiment 1

Figure 12:
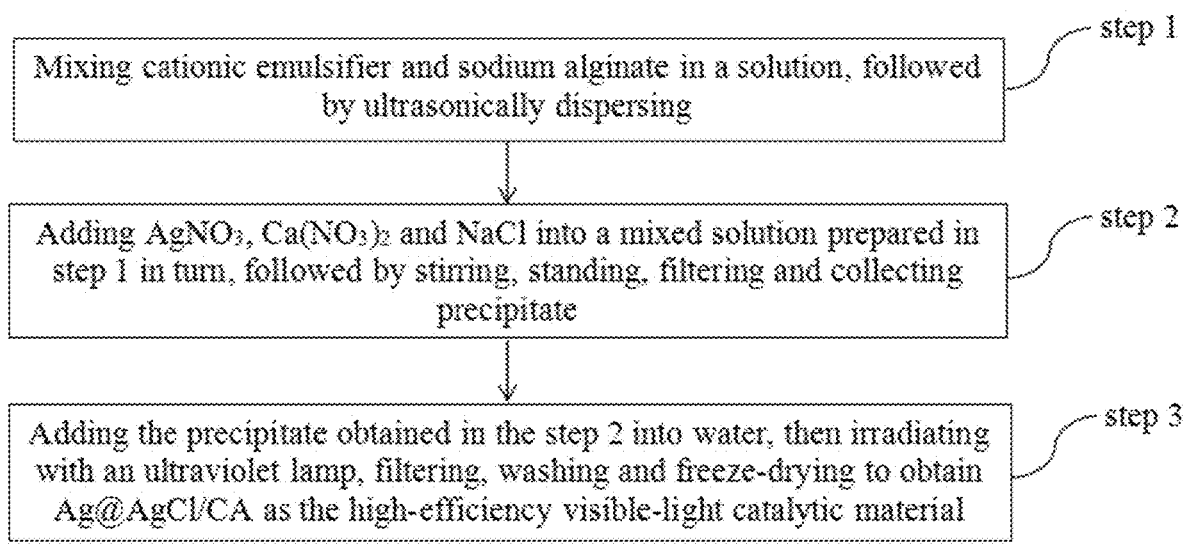
FIG. 12 shows a process of a preparation method of a high-efficiency visible-light catalytic material according to the present application.

A preparation method of an efficient visible-light catalytic material Ag @AgCl/CA includes following steps as shown in FIG. 12:
step 1, mixing cationic emulsifier and sodium alginate in a solution, followed by ultrasonically dispersing;
step 2, adding $AgNO_3$, $Ca(NO_3)_2$ and NaCl into a mixed solution prepared in the step 1 in sequence, followed by stirring, standing, filtering and collecting precipitate; and
step 3, adding the precipitate obtained in the step 2 into water, then irradiating with an ultraviolet lamp, filtering, washing and freeze-drying to obtain Ag @AgCl/CA as the high-efficiency visible-light catalytic material.

Specifically, the preparation method includes:
(1) 100 milliliters (mL) of 2 grams per liter (g/L) sodium alginate (SA) solution is added with 16 mL of cationic emulsifier cetyltrimethyl ammonium bromide (CTAB)

with the concentration of 10 g/L, and dispersed by ultrasonic for 30 minutes (min), so that CTAB and SA solution are fully mixed;

(2) under magnetic stirring, 12 mL of 50 g/L $AgNO_3$ solution is slowly dropped into the reaction system of step (1), and after the dropping is finished, magnetic stirring is continued for 15 min, and then 40 mL of 20 g/L $Ca(NO_3)_2$ solution is slowly dropped into the obtained mixed suspension; the magnetic stirring is continued for another 15 min, then 10 mL of 20 g/L NaCl solution is slowly drop-added, and the stirring is stopped after 30 min, followed by standing for 4 h; the reaction system is filtered with a double gauze, and the obtained small particle precipitate is washed with deionized water for 5 times;

(3) the small particle precipitate obtained in step (2) is added into a 250 mL triangular flask, then the triangular flask is added with 50 mL deionized water, and placed in a 10 Watts (W) ultraviolet lamp for 30 min under magnetic stirring; the particles filtered by double gauze are washed with deionized water for 3 times, and vacuum freeze-dried to obtain the Ag@AgCl/CA photocatalytic material; and 0.2 g of the Ag@AgCl/CA photocatalytic material is added into a 100 mL triangular flask, then 60 mL of 10 milligrams per liter ($mg·L^{-1}$) oxytetracycline (OTC) solution is added, and the initial pH value is adjusted to 6.0, with the temperature being controlled at 40 degrees Celsius (° C.), followed by stirring in the dark for 30 min to achieve adsorption-desorption equilibrium; the triangular flask is then placed in a xenon lamp with 350 W visible-light (filtered by a 420 nanometers (nm) ultraviolet cut-off filter) for catalytic degradation of 10-30 min under magnetic stirring.

Figure 1A:
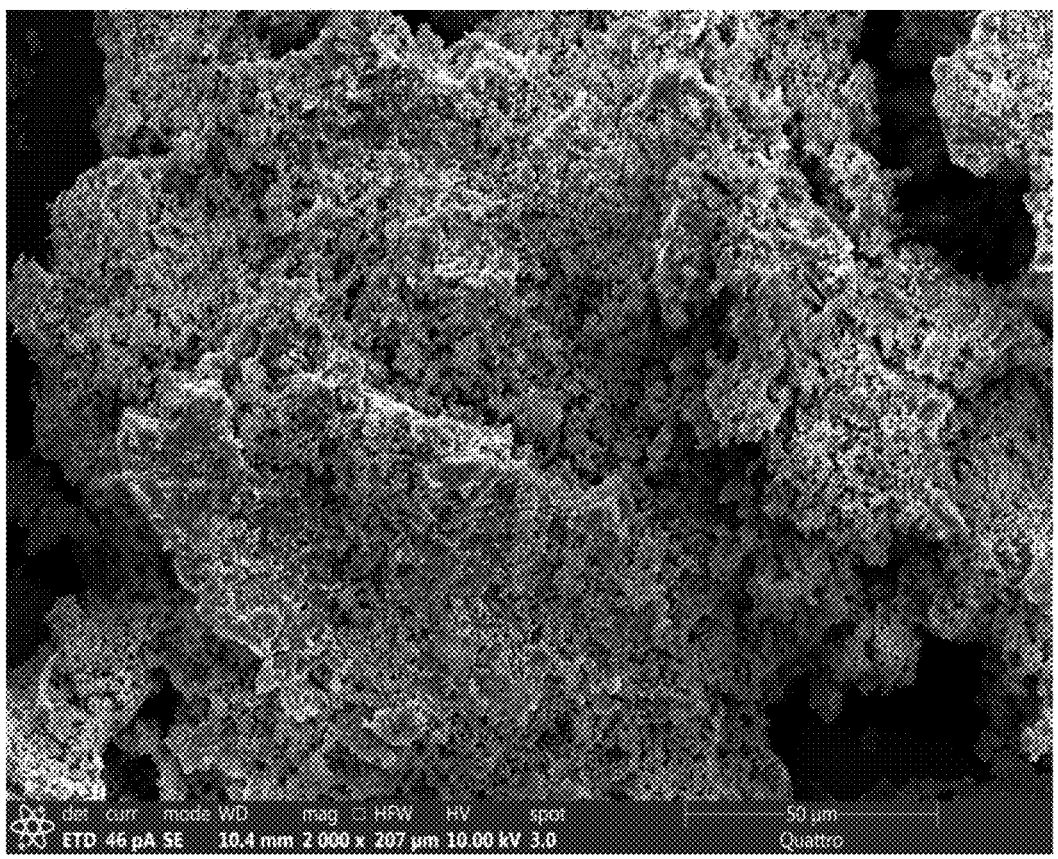
FIG. 1A shows a picture of scanning electron microscope of a photocatalytic material Ag@AgCl/CA prepared in Embodiment 1 at a magnification of 2000×.
Figure 1B:
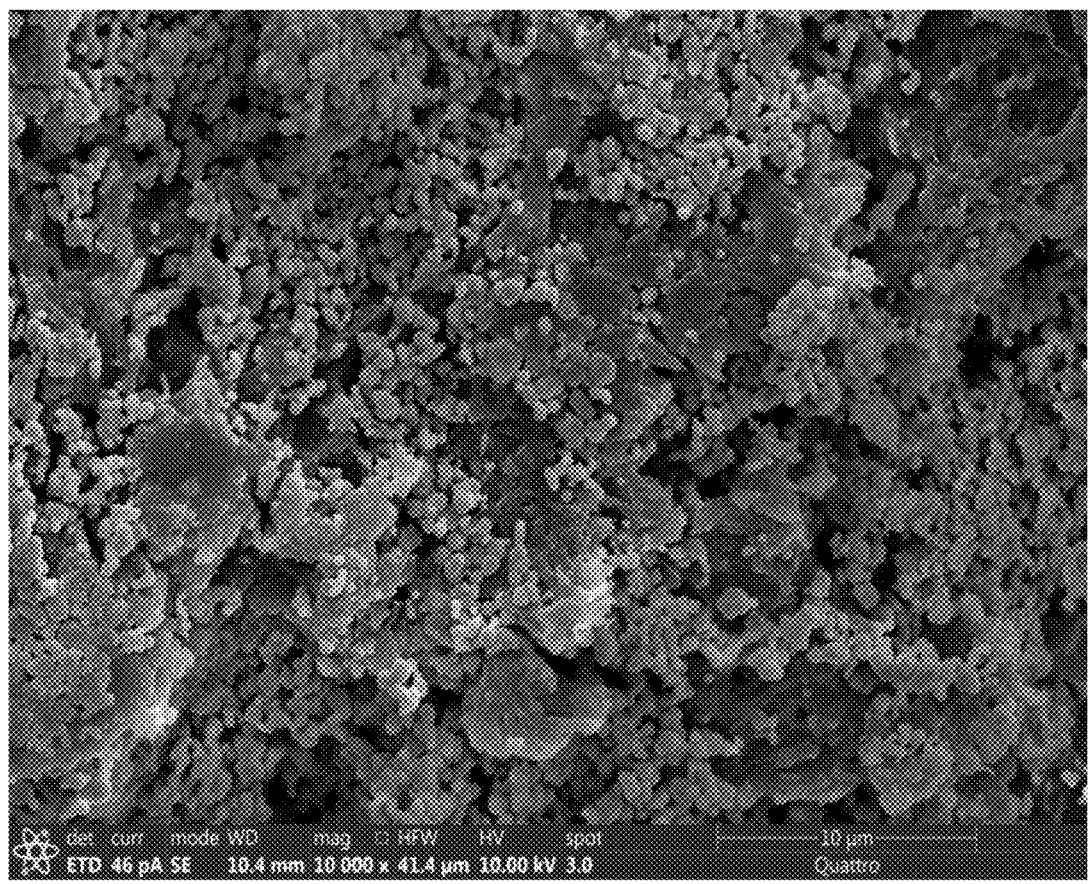
FIG. 1B shows a picture of scanning electron microscope of the photocatalytic material Ag@AgCl/CA prepared in Embodiment 1 at a magnification of 10000×.
Figure 1C:
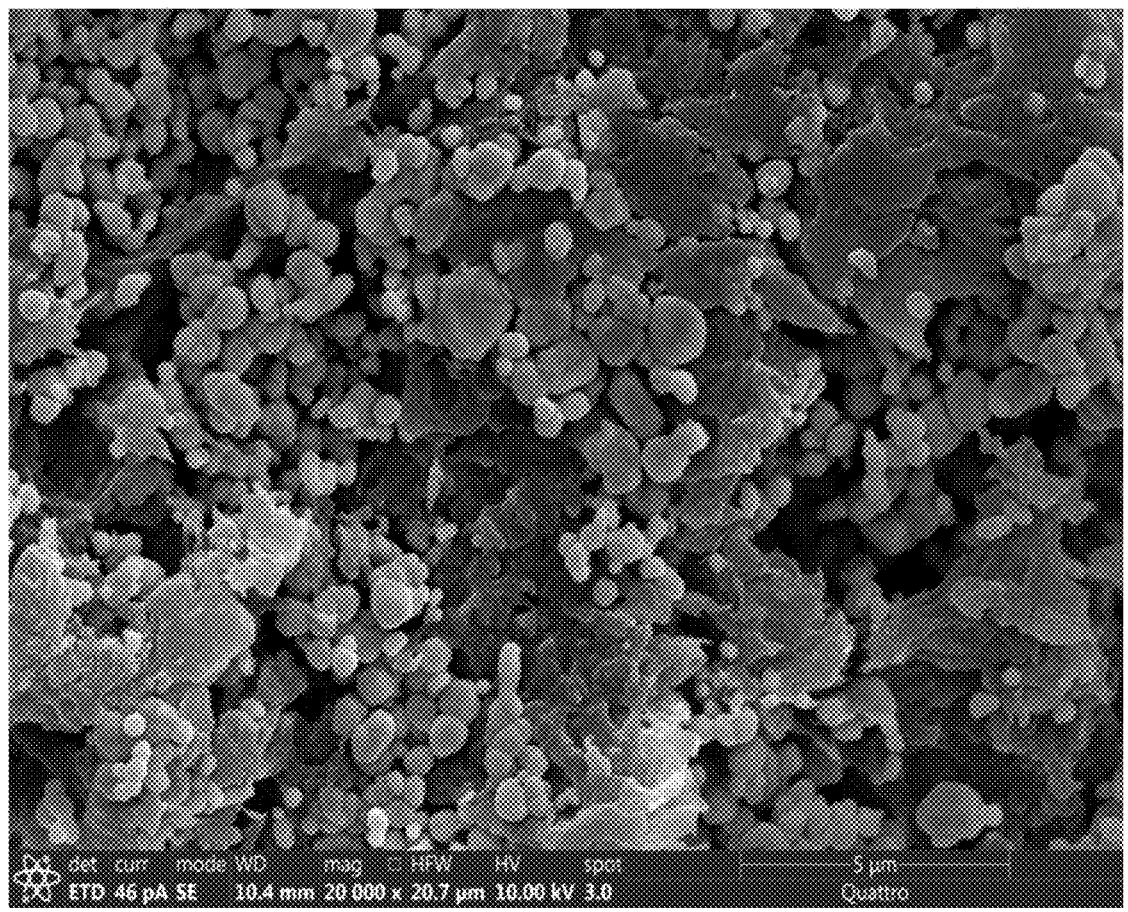
FIG. 1C shows a picture of scanning electron microscope of the photocatalytic material Ag@AgCl/CA prepared in Embodiment 1 at a magnification of 20000×.
Figure 2:
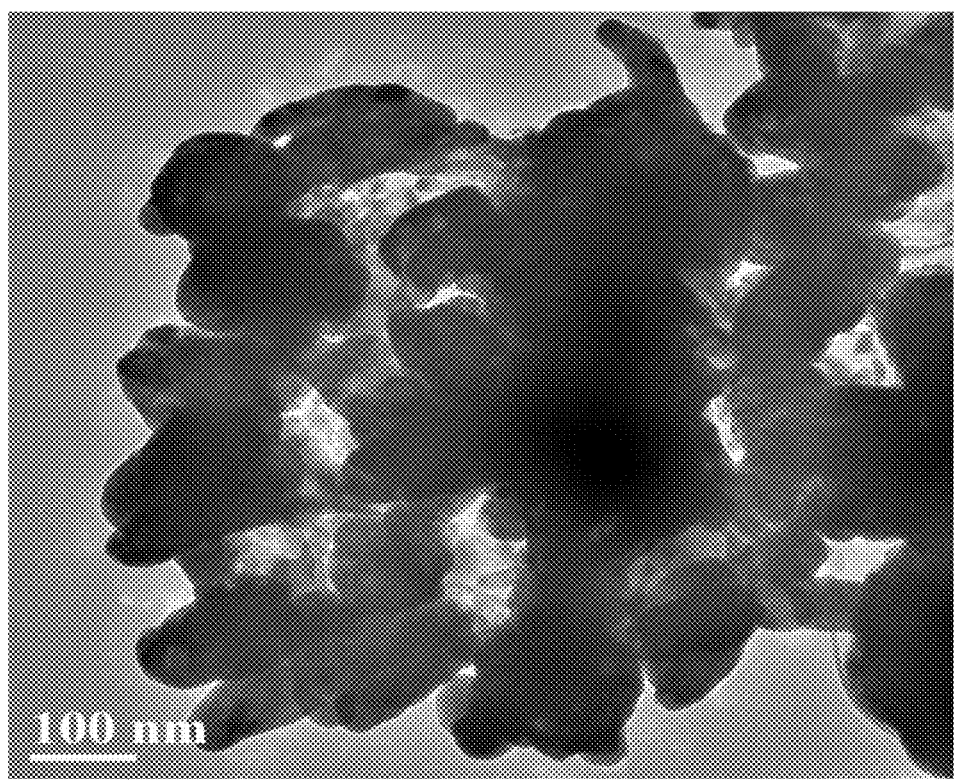
FIG. 2 shows a picture of transmission electron microscope of the photocatalytic material Ag@AgCl/CA prepared in Embodiment 1.

FIG. 1A, FIG. 1B, FIG. 1C and FIG. 2 are the morphologies of the Ag @AgCl/CA photocatalytic material prepared in Embodiment 1 as observed by high-resolution field emission scanning electron microscopy (SEM) and transmission electron microscopy (TEM), respectively. FIG. 1A, FIG. 1B and FIG. 1C are SEM images of Ag@AgCl/CA photocatalytic material with different magnifications, while FIG. 2 is a transmission electron microscope image of Ag@AgCl/CA photocatalytic material.

The calcium alginate (CA) gel structure is loaded with a large number of irregularly shaped Ag@AgCl particles, which partially overlap and accumulate in clusters. The Ag@AgCl particles are sphere-like with a non-uniform particle size of 50-100 nm, indicating that the Ag@AgCl particles are successfully loaded within the $Ca^{2+}$ cross-linked voids and that the gel grid-like structure serves as a spacer to effectively partition the clustered Ag@AgCl particles, which to a certain extent facilitates the adsorption and rapid degradation of OTC and effectively improves the photocatalytic performance of the composite material.

Figure 3:
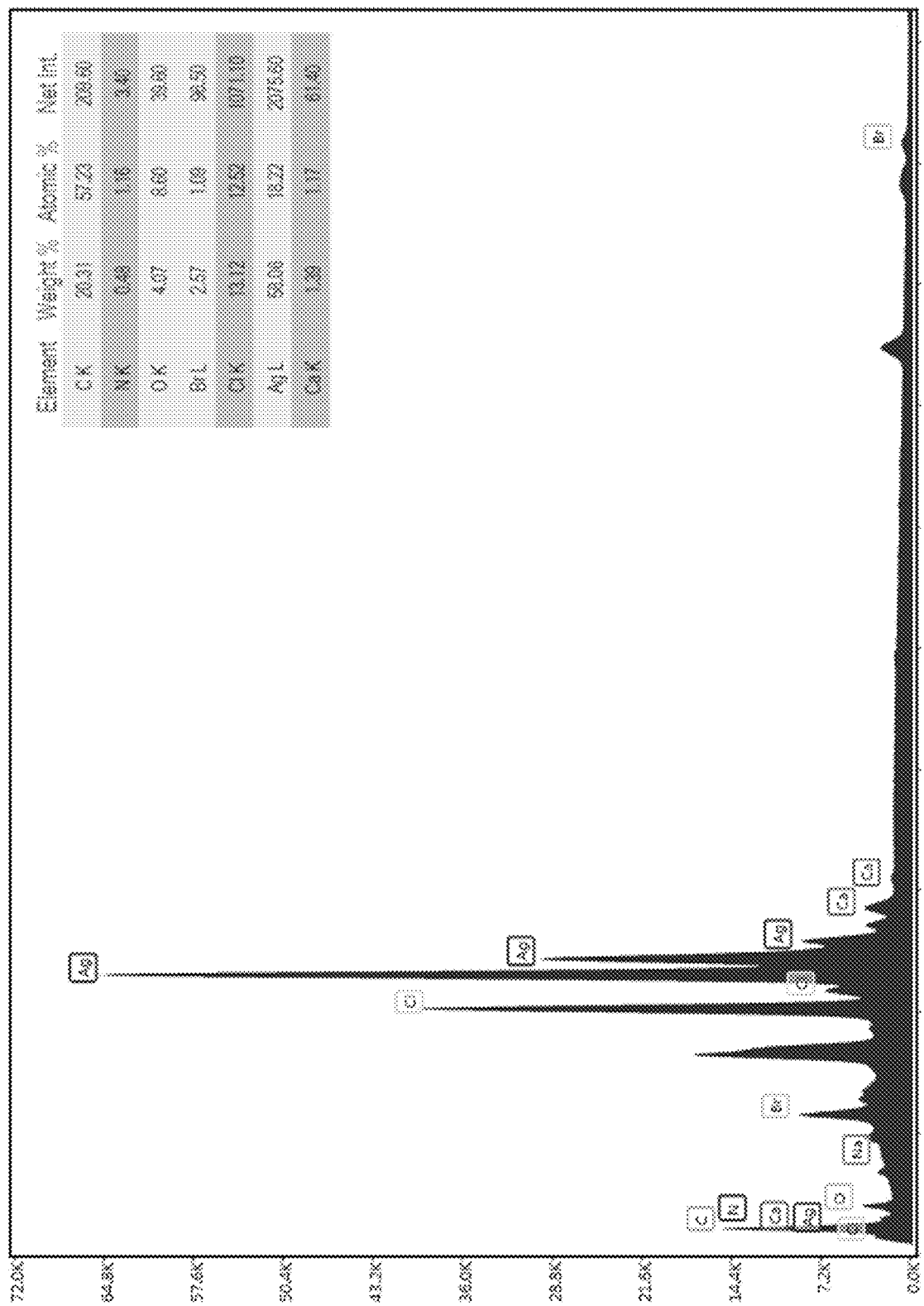
FIG. 3 shows energy dispersive spectrometer (EDS) spectra of the photocatalytic material Ag@AgCl/CA prepared in Embodiment 1.
Figure 4:
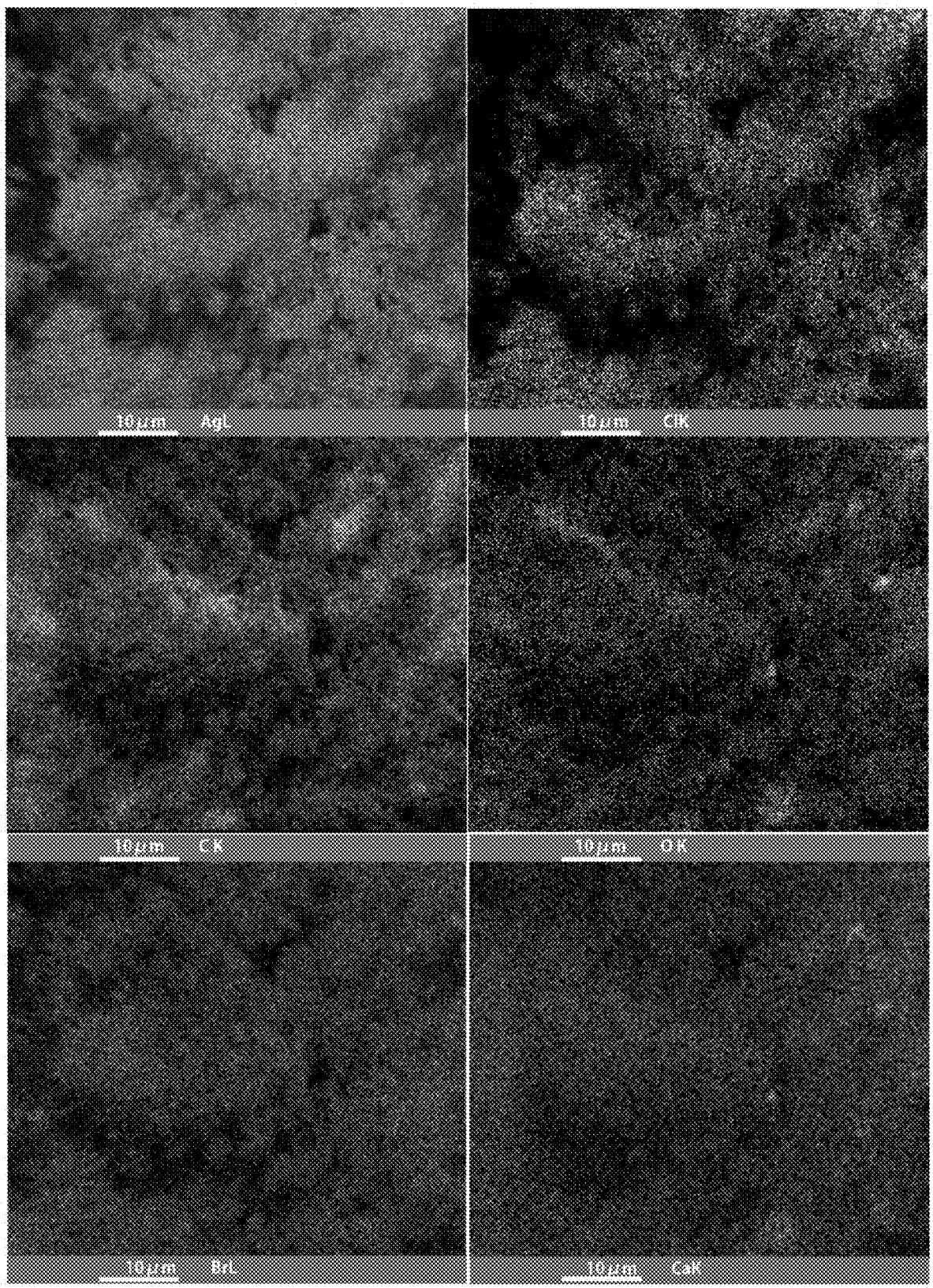
FIG. 4 is a surface mapping of main elements of the photocatalytic material Ag@AgCl/CA prepared in Embodiment 1.

FIG. 3 and FIG. 4 are respectively the energy dispersive spectrometer (EDS) diagram and surface mapping of main elements of the photocatalytic material Ag @AgCl/CA prepared in Embodiment 1.

The results show that the sample contains elements such as Ag, Cl, C, O, N, Ca and Br, among which the mass concentration of element Ag is larger, second only to that of element C. The concentration of Ag atoms is also larger, second only to that of C and O, while the concentration of Cl atoms is about half of that of Ag atoms, i.e. Ag:AgCl=1:1, indicating that there are roughly nano-Ag particles attached to the surface of each AgCl particle. Moreover, the presence of some N and Br atoms in the material indicates that the prepared catalytic material contains a small amount of AgBr impurity particles and CTAB cationic components, while the small amount of AgBr particles also synergizes with the catalytic degradation of the pollutants by Ag@AgCl.

Figure 5:
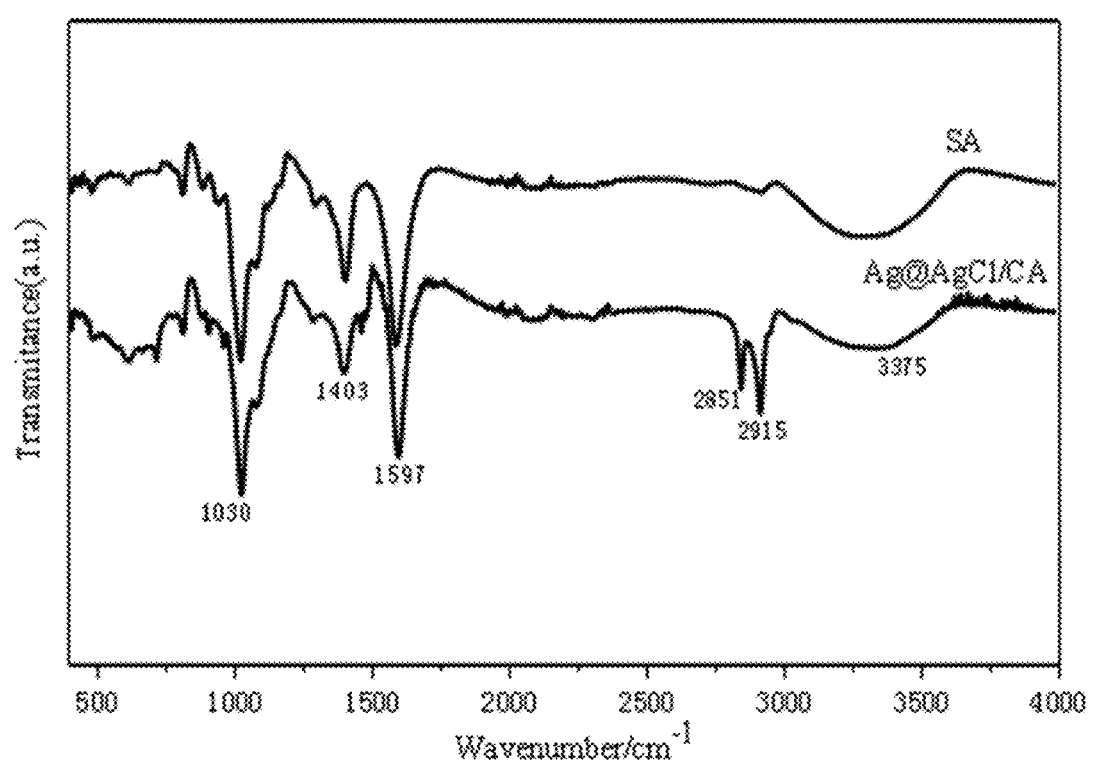
FIG. 5 shows an infrared spectrum of the photocatalytic material Ag@AgCl/CA prepared in Embodiment 1.

FIG. 5 shows an infrared spectrum of the photocatalytic material Ag @AgCl/CA prepared in Embodiment 1.

As can be seen from the FIG. 5, the adsorption peak at 1,030 $cm^{-1}$ is attributed to the C—O—C telescopic vibration adsorption peak of the epoxy group, the peaks appearing at 1,597 $cm^{-1}$ and 1,403 $cm^{-1}$ correspond to the telescopic vibration peak of the C=O of —COOH and the bending vibration peak of —OH in SA, respectively; the adsorption peak at 2,915 $cm^{-1}$ is a methyl (—$CH_3$) telescopic vibration and the adsorption peak at 2,851 $cm^{-1}$ is a manifestation of the telescopic vibration of the methylene (—$CH_2$) of the alkane chain of the CTAB molecule; the composite materials all show a strong adsorption peak around 3,375 $cm^{-1}$, which is a telescopic vibration of the joined hydroxyl group (—OH), i.e. a telescopic vibration of the O—H bond of the oxygen-containing functional group.

Figure 6A:
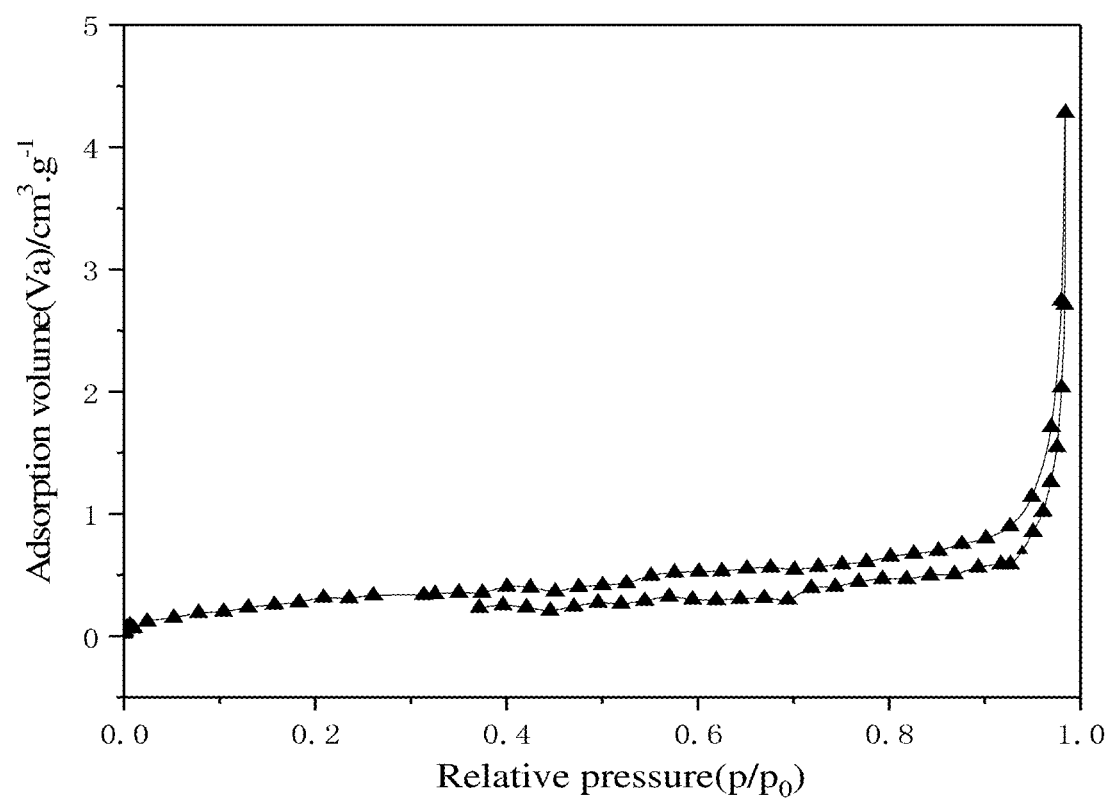
FIG. 6A shows $N_2$ adsorption-desorption isotherms of the photocatalytic material Ag@AgCl/CA prepared in Embodiment 1.
Figure 6B:
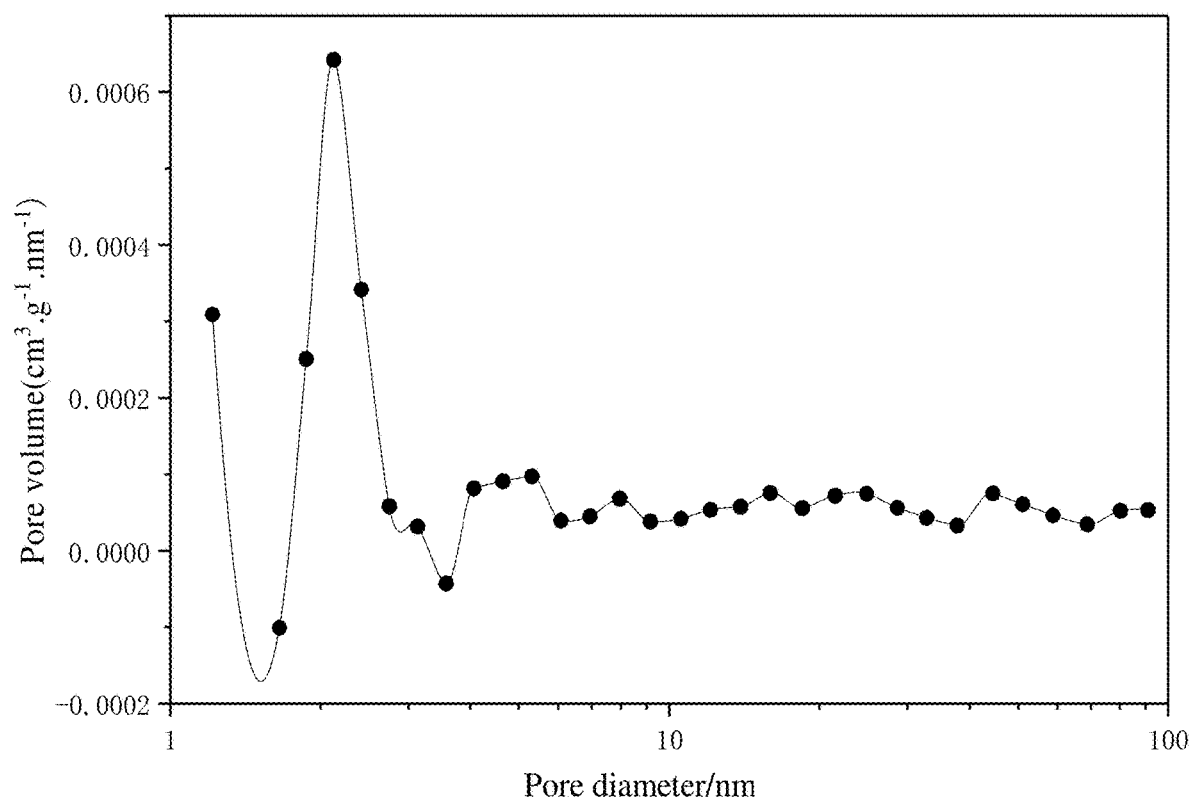
FIG. 6B is a diagram illustrating pore size distribution of the photocatalytic material Ag@AgCl/CA prepared in Embodiment 1.

FIG. 6A and FIG. 6B show the $N_2$ adsorption-desorption isotherm and the pore size distribution of the photocatalytic material Ag@AgCl/CA prepared in Embodiment 1.

The isotherms are in accordance with Class IV isotherms, indicating that the composite material has a mesoporous (mesopore) structure, which is conducive to the contact between the catalyst and the OTC, as well as to the adsorption of visible-light, therefore reducing the electron-hole combination and improving the photocatalytic degradation performance of the composite material. The material has a specific surface area of 0.96553 $m^2/g$, an average pore size of 21.311 nm and a pore size distribution between 2 and 100 nm. A certain amount of catalyst has a limited surface area, and the catalytic degradation effect is mainly determined by the amount of pollutants adsorbed on the catalyst surface. According to the photocatalytic oxidation mechanism, the compounding of photogenerated electrons and holes on the catalyst surface is completed in less than $10^{-9}$ seconds (s), whereas the rate at which carriers are captured is relatively slow, usually taking $10^{-8}$-$10^{-7}$ s. Therefore, only pollutants adsorbed on the catalyst surface have the possibility to obtain highly active electrons to react with holes.

Figure 7A:
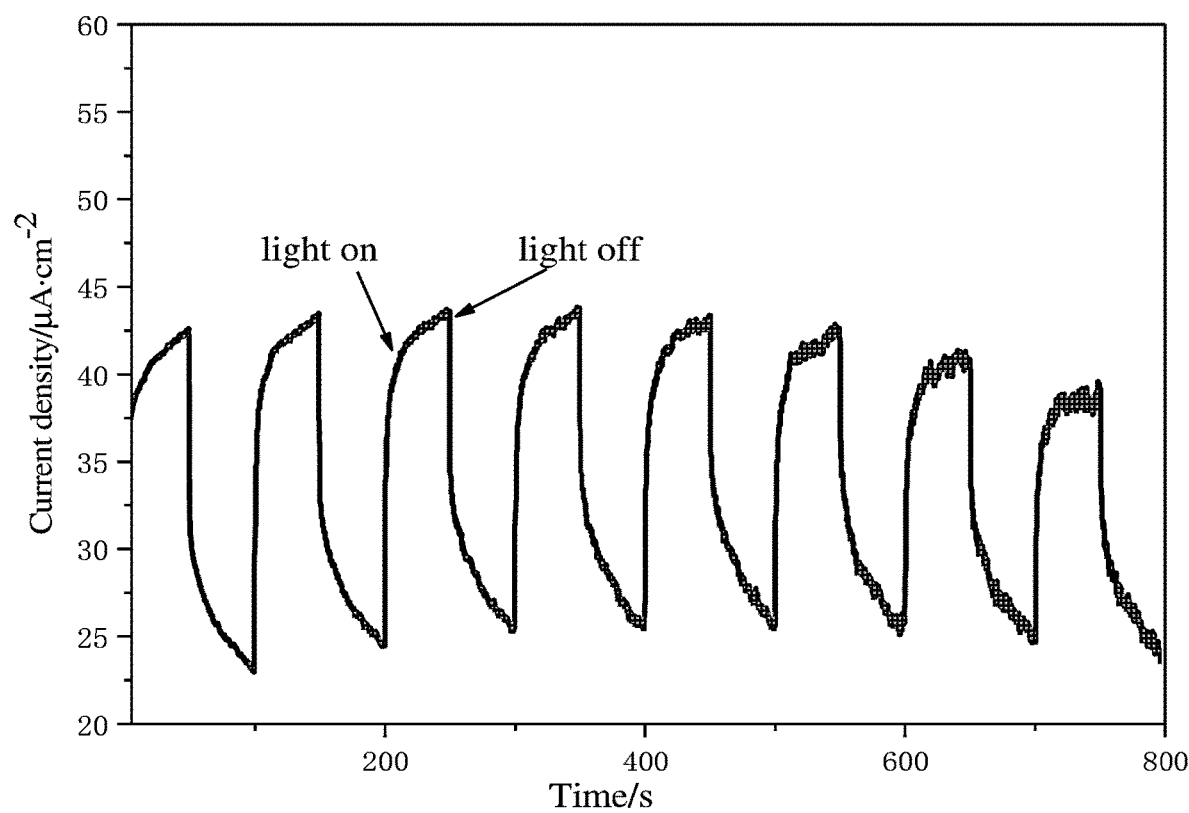
FIG. 7A is a diagram showing transient photocurrent response of the photocatalytic material Ag@AgCl/CA prepared in Embodiment 1.

FIG. 7A shows the transient photocurrent response characteristics of the photocatalytic material Ag@AgCl/CA prepared in Embodiment 1 at each switched-on and shaded light.

It can be seen from the drawing that the Ag@AgCl/CA composite material produces a fast and stable photocurrent with good reversibility under visible-light irradiation, suggesting that the composite material has strong photoresponsiveness, good photocurrent response performance, high photogenerated electronic transfer efficiency and high separation efficiency of electron-hole pairs, thus indicating that the prepared composite photocatalytic material has high photocatalytic activity.

Figure 7B:
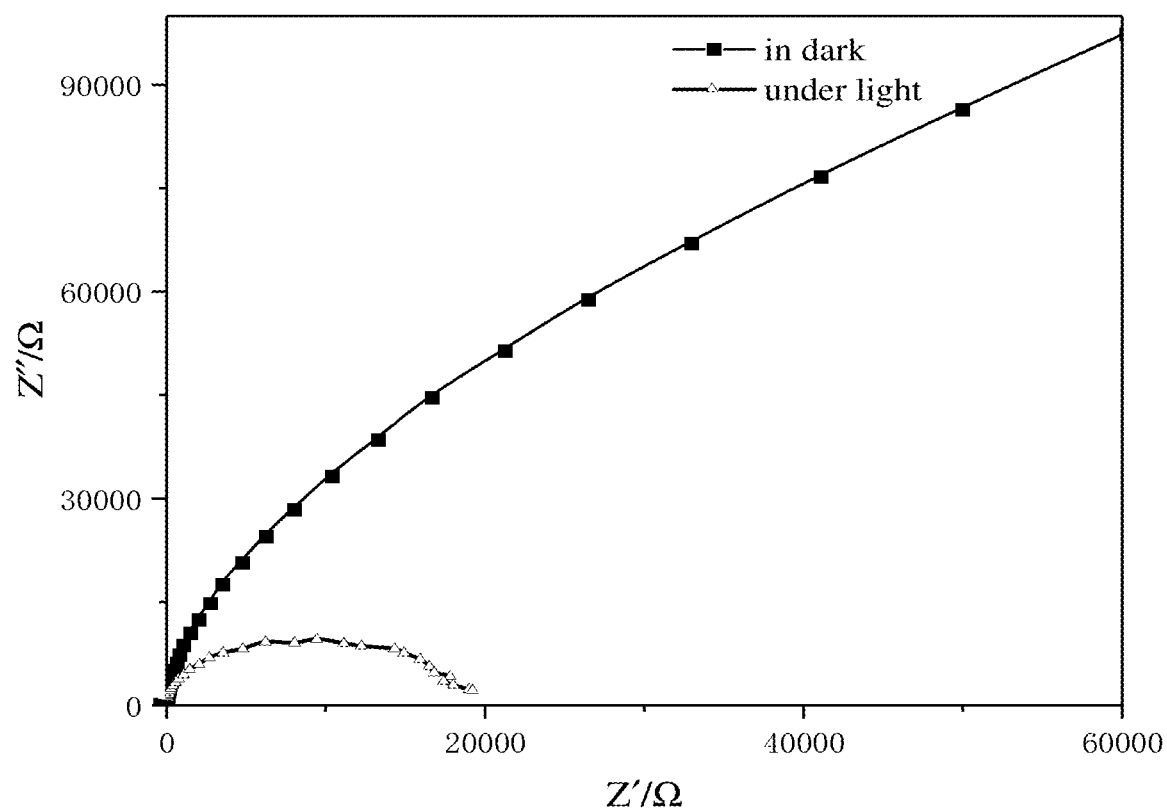
FIG. 7B is a diagram showing electrochemical impedance spectrum (EIS) of the photocatalytic material Ag@AgCl/CA prepared in Embodiment 1.

FIG. 7B shows the electrochemical impedance spectrum (EIS) of the photocatalytic material Ag@AgCl/CA prepared in Embodiment 1, and the characterization results of the EIS indicate that the radius of the arc is relatively large in the absence of light, and the radius of the arc decreases significantly with light irradiation. Therefore, it is evident that the prepared composite material photocatalytic material exhibits good photocatalytic performance with small photogenerated electron transfer resistance and low photogenerated electron-hole complexation rate under light radiation.

Figure 8:
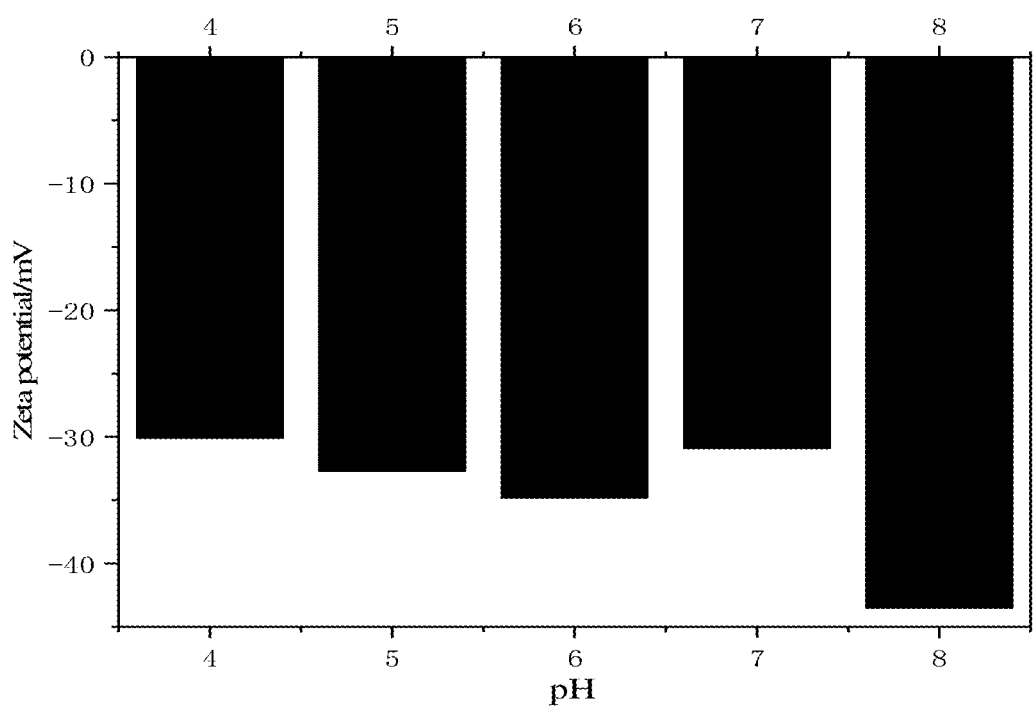
FIG. 8 is a potential diagram of the photocatalytic material Ag@AgCl/CA prepared in Embodiment 1.

FIG. 8 shows that the zeta potentials of the Ag@AgCl/CA photocatalytic materials prepared in Embodiment 1 at pH 4, 5, 6, 7 and 8 are respectively −30.1 millivolts (mV), −32.7 mV, −34.8 mV, −30.9 mV and −43.5 mV, indicating that the catalytic materials are negatively charged on the surface of the catalytic materials at pH 4-8, at which time there is a repulsive effect between the particles of the catalytic materials, resulting in a potential resistance effect, suggesting that the catalytic material has a strong stability. Also, studies have shown that when the initial pH of the solution is over 7, $Ag^+$ combines with the hydroxide in the solution to form a precipitate that discolours the solution, so the catalyst is better used under acidic conditions.

Figure 9:
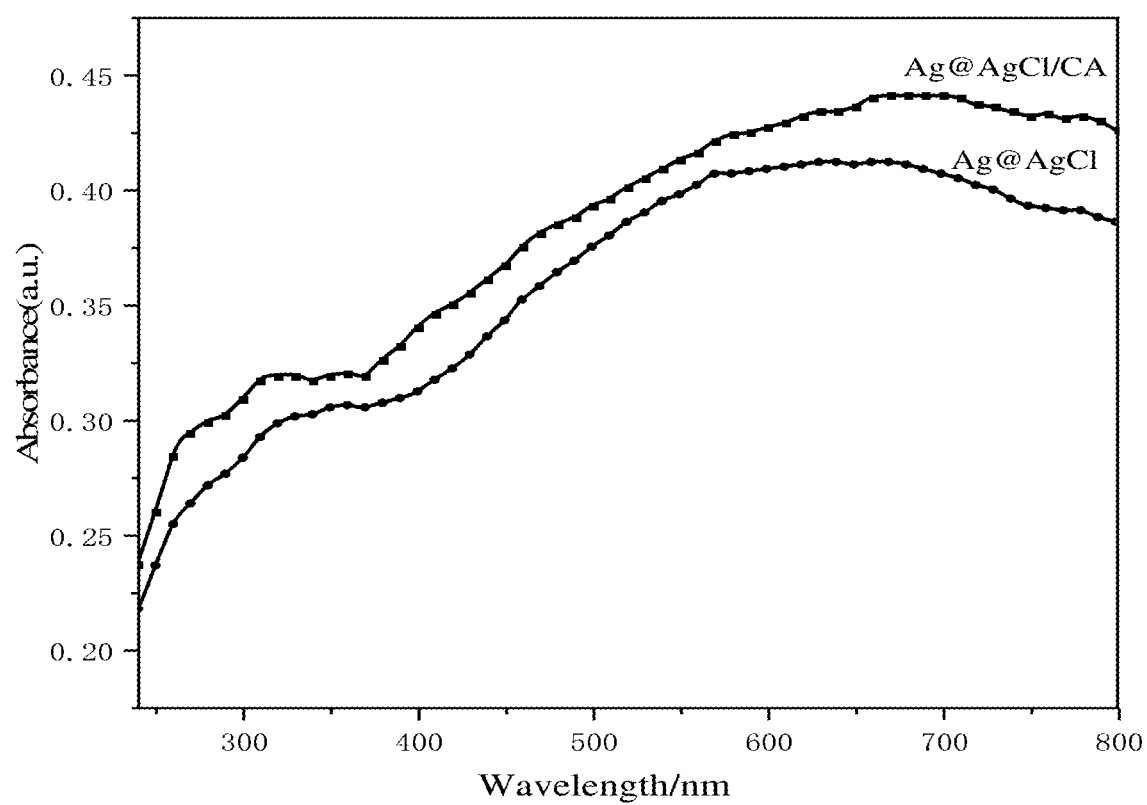
FIG. 9 shows ultraviolet-visible (UV-Vis) diffuse reflection spectroscopy (DRS) diagram of Ag@AgCl/CA prepared in Embodiment 1 and Ag@AgCl.

FIG. 9 shows ultraviolet-visible (UV-Vis) diffuse reflection spectroscopy (DRS) diagram of Ag@AgCl/CA prepared in Embodiment 1 and Ag@AgCl. As shown in FIG. 9, the Ag@AgCl/CA catalytic material not only has a strong adsorption in the UV region below 350 nm, but also has a relatively strong adsorption in the visible region range from 500 to 650 nm. The indirect energy band gap of AgCl is reported to be around 3.25 electron volts (eV), and AgCl has almost no adsorption properties in the 400-800 nm range, except for the adsorption band in the UV region. Consequently, the catalytic material has strong adsorption properties in the visible region attributed to the resonance adsorption band generated by the surface plasmon resonance (SPR) effect of Ag nanoparticles.

Figure 10:
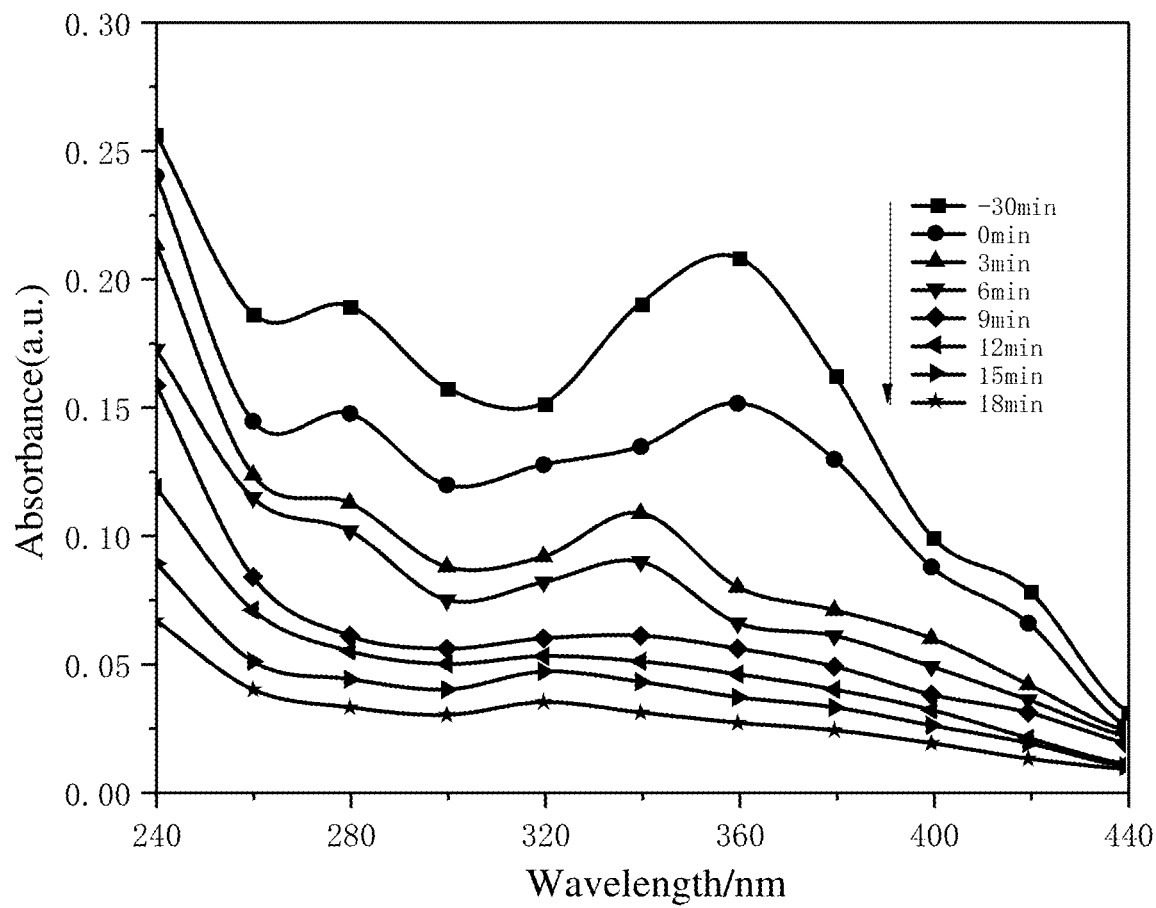
FIG. 10 shows adsorption spectra of Ag@AgCl/CA prepared in Embodiment 1 for oxytetracycline (OTC) photodegradation under visible-light.

FIG. 10 shows the adsorption curves of the Ag@AgCl/CA catalytic material prepared in Embodiment 1 for the photocatalytic degradation of OTC at 40° C. with an initial pH of the solution of 6 at different time. The OTC has 2 obvious adsorption peaks at 275 nm and 355 nm respectively. After 30 min of adsorption in the dark, the adsorption peaks decrease substantially. After 6 min of irradiation, the adsorption peak at 275 nm disappears, while the adsorption peak at 355 nm decreases significantly. With the extension of irradiation time, the absorbance at 355 nm gradually decreases and the adsorption peak is slightly blue-shifted.

Figure 11:
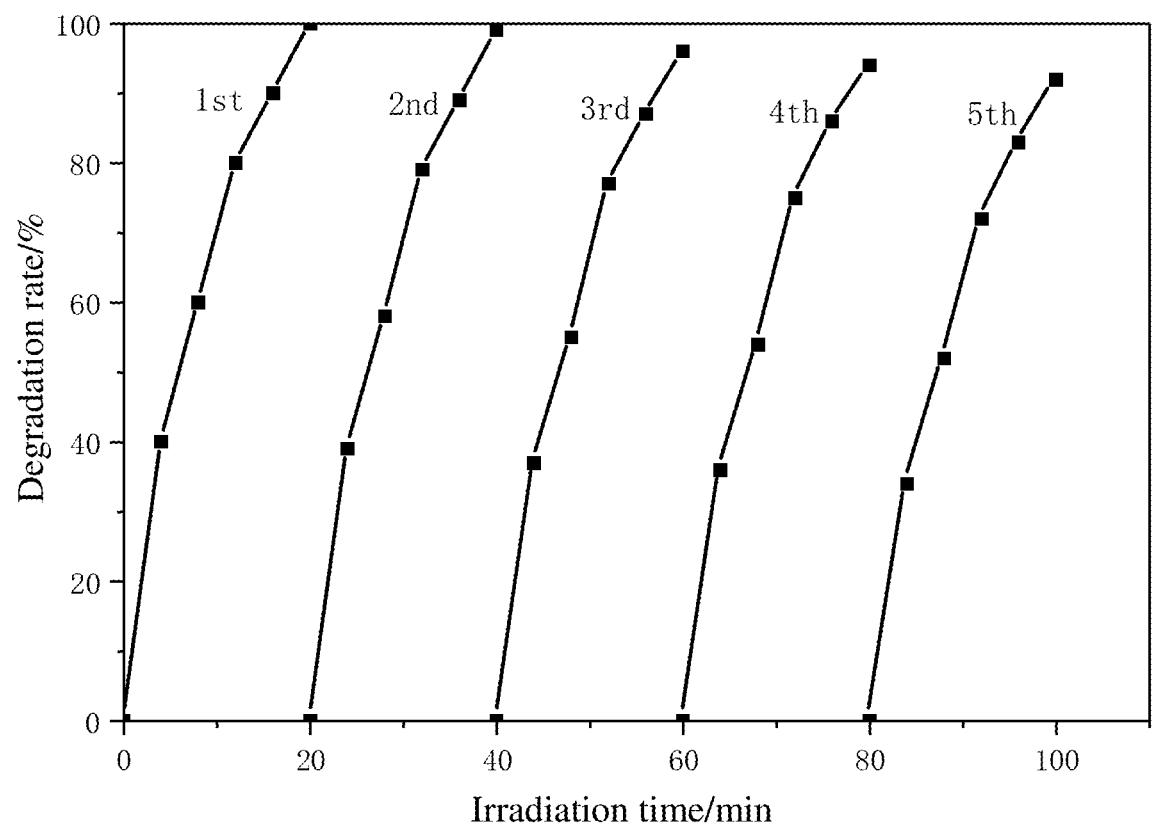
FIG. 11 shows a recycling stability test of Ag@AgCl/CA prepared in Embodiment 1 for photocatalytic OTC degradation.

The degradation curves of the Ag@AgCl/CA catalytic material prepared in Embodiment 1 cycled 5 times are shown in FIG. 11. The activity of the photocatalytic material shows no significant change, and the degradation rate of the OTC is still greater than 90.0%, indicating that the catalytic material has good photocatalytic stability and reusability, and has great potential for application as a visible photocatalyst in practical production.

The above-mentioned embodiments only describe the preferred mode of the present application, and do not limit the scope of the present application. Under the premise of not departing from the design spirit of the present application, various modifications and improvements made by ordinary technicians in the field to the technical scheme of the present application shall fall within the protection scope determined by the claims of the present application.

What is claimed is:

1. A preparation method of a high-efficiency visible-light catalytic material, comprising following steps:
   (1) mixing cationic emulsifier and sodium alginate in a solution, followed by ultrasonically dispersing;
   (2) adding $AgNO_3$, $Ca(NO_3)_2$ and NaCl into a mixed solution prepared in the step (1) in sequence, followed by stirring, standing, filtering and collecting precipitate; and
   (3) adding the precipitate obtained in the step (2) into water, then irradiating with an ultraviolet lamp, filtering, washing and freeze-drying to obtain Ag @AgCl/CA as the high-efficiency visible-light catalytic material;
   wherein the cationic emulsifier is cetyltrimethyl ammonium bromide.

2. The preparation method according to claim 1, wherein a duration for the standing in the step (2) is 4-8 h.

3. The preparation method according to claim 1, wherein a mass ratio of the sodium alginate to the $AgNO_3$, the $Ca(NO_3)_2$ and the NaCl is 1:(2-3.5):4:(0.5-2).

4. The preparation method according to claim 1, wherein in the step (3), a power for the irradiating with the ultraviolet lamp is 10 W, and a duration is 30 min.

* * * * *